United States Patent [19]
Shin et al.

[11] Patent Number: 5,789,837
[45] Date of Patent: Aug. 4, 1998

[54] HIGH-TEMPERATURE SUPERCONDUCTING MAGNETIC BEARING

[75] Inventors: Sung-chul Shin; Alexei Filatore, both of Daejeon-Si, Rep. of Korea

[73] Assignee: Korea Advanced Institute of Science & Technology, Daejeon-Si, Rep. of Korea

[21] Appl. No.: 698,235

[22] Filed: Aug. 14, 1996

[51] Int. Cl.$^6$ .................................................. H02K 7/09
[52] U.S. Cl. ............................ 310/90.5; 310/182; 310/90; 310/13; 310/15; 310/114
[58] Field of Search ........................ 360/90.5, 106, 360/107, 109; 310/90, 90.5, 182, 13, 15, 27, 20

[56] References Cited

U.S. PATENT DOCUMENTS

| | | | |
|---|---|---|---|
| 3,937,148 | 2/1976 | Simpson | 104/148 MS |
| 4,886,778 | 12/1989 | Moon et al. | 505/1 |
| 5,177,387 | 1/1993 | McMichael et al. | 310/90.5 |
| 5,399,547 | 3/1995 | Negm et al. | 505/430 |

Primary Examiner—Steven L. Stephen
Assistant Examiner—Timothy A. Williams
Attorney, Agent, or Firm—Dilworth & Barrese

[57] ABSTRACT

A passive magnetic bearing structure for radially supporting a rotor with respect to a stator is provided, in which a magnetic circuit is mounted on the rotor or stator for generating two strongly different axial magnetic fields in two concentric angular gaps coaxial to the rotation axis and radially spaced from one another. At least three shortened superconducting turns are mounted on the stator circumferentially around the rotation axis so that under any tolerable shift of the rotor, one edge of every turn will be placed in one annular gap comprising magnetic field, and the radially opposite edge will be placed in the other gap. The invention is also directed to a linear magnetic bearing structure for restricting unwanted movement of a slider, comprising the slider, a guideway, and a magnetic circuit mounted on the slider or guideway for generating two strongly different magnetic fields perpendicular to the movement direction, in two different layers lengthened in the sliding direction and spaced from one another in the direction normal to both the sliding and magnetic field directions. A shortened superconducting turn is mounted on the slider or guideway so that any tolerable shift of the slider, one edge of every turn will be placed in one layer comprising magnetic field, and the radially opposite edge will be placed in the other layer.

17 Claims, 6 Drawing Sheets

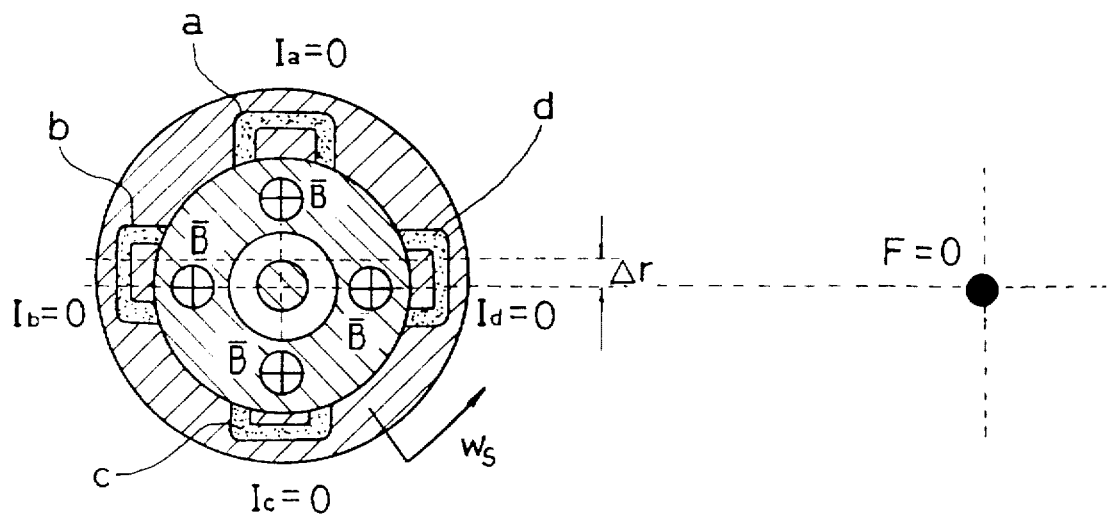
Fig. 6
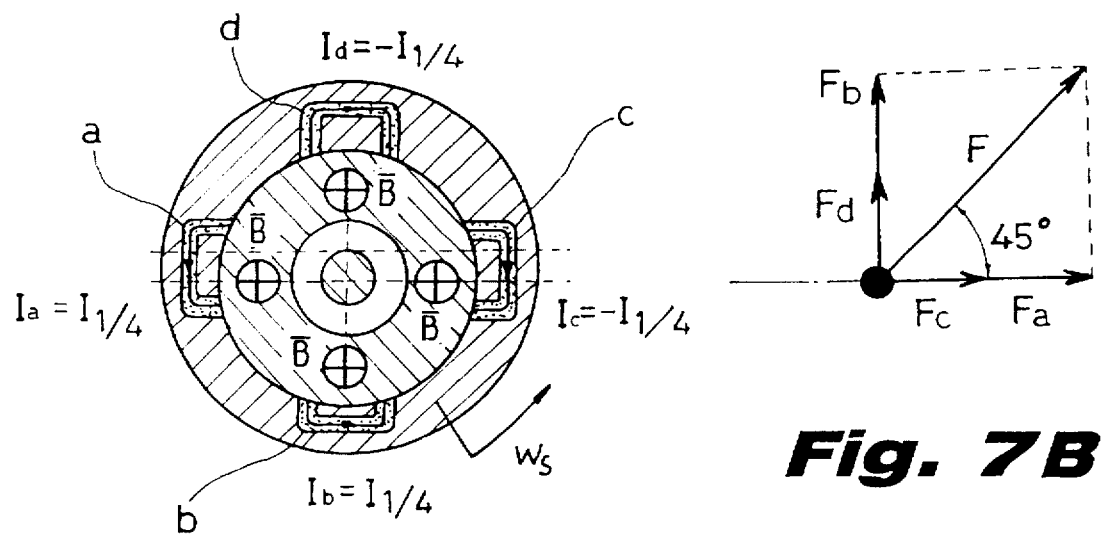
Fig. 7A
Fig. 7B

HIGH-TEMPERATURE SUPERCONDUCTING MAGNETIC BEARING

FIELD OF THE INVENTION

This invention relates to a high rotation speed and high load capacity bearing and more particularly to a passive magnetic bearing.

BACKGROUND OF THE INVENTION

Conventional mechanical bearings provide high load capacity and high stiffness but have a limited durability especially under high rotation speed. Great friction loss, noise and requirement of lubricants also make use of a mechanical bearing impracticable under high rotation speed or severe environments such as under low temperature or vacuum.

Other types of bearing are liquid film bearings or gas film bearings. Most part of these devices can be classified as self-acting or externally pressed bearings. Externally pressed bearings can provide a very high load-carrying capacity. For example, the 236-ton high resolution spectrometer has been suspended by means of five air bearings in the Los Alamos Laboratory (USA). The main problem with such bearings is that they require very complicated pneumatic or hydraulic system for their operation, including pumps, valves, seals and conduits. Another problem is continuous external energy consumption. For high-speed applications self acting gas or liquid film bearings are usually used. The external pneumatic system and energy source are not needed for operation of these devices but their production is a big problem. It is sometimes necessary to construct gas bearing of a material that has long-time stability and dimensions accurate to microinches (for example hardened tool steel with bearing surfaces finished optically smooth). Besides very small size of a clearance in self acting bearings (near 25 μin) makes it very sensitive to any contaminates. Additional shortages of this device are relatively high energy loss during rotation and limited load capacity.

One more approach to the solution of the non-contact suspension problem is the use of magnetic bearings. Conventional magnetic bearings use the levitation of a rotor made of soft magnetic material or including permanent magnet in an external magnetic field. They are simple, reliable and non-expensive; provide low rotational dissipation and can work under high rotational speed and severe environments. Such systems are initially unstable and all conventional magnetic bearings require an external system for the control of the supporting magnetic field that has to be generated by coils with current. It causes shortages of these systems such as continuous external energy consumption, complicated feedback control system and limited load capacity. The last one is limited by two factors. First of all, increase of the supporting force causes increase of heat release in windings. Then, the higher load capacity is, the higher inductivities of the field generating coils and values of the currents in this coils have to be. Consequently, higher voltages have to be applied to the coils to vary currents in the coils and supporting force with high speed. As far as tolerable voltages on the real electronic units of the electrical circuit of the feed back loop are limited it causes the deterioration of the dynamic characteristics of a magnetic bearing.

Another variant of a magnetic bearing uses the interaction of a superconductor with an external magnetic field. Such system is absolutely stable and an external control system is not needed. All known superconducting materials can be classified as type I or type II superconductors. Type I superconductors completely expel magnetic field until the critical magnetic field value $H_c$ is reached. They have no superconducting properties in higher magnetic fields. Type II superconductors completely expel magnetic field until the first critical magnetic field value $H_{c1}$, but their superconducting properties are partially preserved until the second critical field value $H_{c2}$. Between these values magnetic field penetrates into the superconducting sample and the process of the superconductor remagnetization shows strong hysteresis. Moreover, the magnetic moment of the magnetized type II superconductor changes with time due to so called magnetic flux creep.

Designs of the magnetic bearing using low temperature type I superconductors or type II superconductors working under magnetic field lower than $H_{c1}$ are well-known (Newhouse, Vernon L. "Applied superconductivity", Vol.2, Chapter 7, p.489.). Because the values of $H_c$ or $H_{c1}$ are small (smaller than 1500 Oe), these devices show small stiffness and load capacity. Besides, complicated and expensive system for cooling down to the temperature of liquid helium is required for the bearing operation. At the same time, low-temperature superconducting magnetic bearings are marked by perfect dynamic characteristics and exceptionally low energy loss during rotation.

Though type II superconductors such as Nb-Ti have been known for years and $H_{c2}$ of these materials is significantly higher than 1500 Oe, no bearing using these materials has been made. The reason was the obvious fact that the hysteresis of the superconductor remagnetization causes hysteresis of the force-displacement bearing characteristics and position of the rotor becomes unpredictable. Besides the effect of the magnetic flux creep in type II superconductors causes time drift of the bearing characteristics.

Recent discovery of high-temperature superconductors capable of working under temperature of liquid nitrogen encouraged many research teams to produce a superconducting magnetic bearing using new materials and requiring only relatively simple, cheap and reliable system for cooling to the temperature of liquid nitrogen. But the problem is that all presently known high temperature superconducting materials are typical type II superconductors and all above mentioned problems arising due to remagnetization hysteresis and magnetic flux creep take place. All produced prototypes of high-temperature superconducting magnetic bearings (for example see Advances in Cryogenic Engineering 37, Part A, 1992; Appl. Phys.Lett. 60, No.15, p.1893, 1992, IEEE Transaction on Applied Superconductivity 3, No.1, p.388, 1993; Cryogenics 32, No.7 p.628, 1992;U.S. Pat. No. WO 92/10871) are marked by very high load capacity, durability and very low rotational friction. At the same time, extremely high force-displacement characteristic hysteresis, unpredictable space position of a rotor, problem of initial setting of a rotor in the central position during system cooling make these devices impracticable. Besides such design has a significant disadvantage of a long-time drift of the bearing characteristics arising due to the magnetic flux creep into superconductors. To reduce influences of the magnetic flux creep and the hysteresis of the superconductor remagnetization, it would be desirable to reduce changes of a magnetic field penetrating into the superconductor as much as possible.

Additional design shortfall is low ratio of the load capacity vs the construction size due to a high reluctance of the magnetic gap, which leads to indispensability of using a large-size magnetic field source. It is necessary to note also that the properties of superconducting materials in these constructions are used very irrationally. In ideal case, in every elementary volume of the superconducting sample the current flows in the plane normal to the external force direction and a magnetic field is normal both to the external force and the current. Some additional component of a magnetic field is inevitable in all presently known designs of the magnetic bearing using type II superconductors. This component induces an elementary force normal to the external force. Hence this component of magnetic field is not useful and only suppresses current value and increases interior stresses in a sample.

To summarize briefly it would be desirable to use type II superconductors to design a passive magnetic bearing for high load applications but reduce or eliminate the influence of the remagnetization hysteresis and the magnetic flux creep.

For this goal it would be desirable to provide optimal distribution of the magnetic field in superconductors so as to exclude useless magnetic field components and reduce changes of a magnetic field, penetrating into superconductors, under any movement of a rotor.

It would be especially desirable to eliminate changes of a magnetic field, penetrating into superconductors, under rotor rotation so that rotation energy loss will be minimized.

It would be desirable to reduce reluctance of a magnetic gap and use small size source of a magnetomotive force to generate supporting magnetic field.

It would be desirable to ensure single rotor equilibrium position that has to coincide with the bearing symmetry axis.

It would be desirable to provide automatic initial setting of a rotor in the equilibrium position.

It would be desirable to provide long-term stability of bearing characteristics.

It would be desirable to use high-temperature superconducting materials and relatively cheap, simple and reliable system of cooling by liquid nitrogen correspondingly.

It would be desirable to take into account the anisotropy of the electro-magnetic properties of the presently known high-temperature superconducting materials (for example, in $YBa_2Cu_3O_{7-x}$ sample magnetic field should be applied along "c" axis and current should flow in the "ab" plane).

SUMMARY OF THE INVENTION

The aim of the invention is a design of a passive bearing marked by exceptionally high load capacity, exceptionally low friction loss, very high durability and reliability, having single rotor equilibrium position, well-defined force-displacement characteristics and required minimal external energy consumption.

The design uses type II superconductors, particularly high-temperature superconductors.

The invention takes advantage of the interaction of a superconducting shortened turn with an external magnetic field.

In the most basic form an embodiment comprises a planar shortened turn made of superconducting material, which is exposed to an external magnetic field, normal to the turn plane, and turned into superconducting state. It can be assumed without loss of generality that the turn is shaped as a rectangle. The magnetic field has to be shaped so that two mutually opposite sides of the rectangle will be exposed to uniform fields. The field values have to be much different for different sides. Areas of uniformity have to be long enough in the direction normal to these sides so that there will be no alteration of the magnetic fields around the sides under any tolerable shift of the turn in this direction. If such shift from the initial position takes place, screening current will appear in the turn. If the turn were made of a perfect conductor, the screening current would have such value that total magnetic flux, which is a sum of the external flux and flux produced by the screening current, will not change. As a result some forces will act on the rectangle sides comprising currents and exposed to a magnetic field. As far as magnetic fields are different for two sides normal to the shift direction, total force acting on the turn will be different from zero and directed oppositely to the shift direction. If the areas of the uniform magnetic fields are lengthened along the rectangle sides normal to the shift direction, the turn can move along these sides without any friction. This embodiment can be thought as a simplest linear magnetic bearing restricting one translation degree of freedom of a slider comprising a superconducting turn.

Continuous circular movement of the turn can be provided if the areas of the uniform magnetic fields form concentric rings with outer diameters much higher than turn size. If at least three superconducting turns are mounted on the common shaft circumferentially around the rotation axis (which is the common axis of the ring areas comprising uniform magnetic field), then an embodiment of a radial magnetic bearing will be obtained.

The advantages of the above described approach appear when shortened turn is made of type II superconductor. It is easy to see that only small volumes of the superconductor on the rectangle sides directed along disturbing force axis, are remagnetized during a turn shift from the initial position. Hence the influence of the remagnetization hysteresis is negligibly small. Then, current in superconducting turn is directed perpendicular to the external magnetic field on the turn sides normal to the force axis. The magnetic field on the other two sides can be made much smaller. Thus current-carrying capacity of a superconducting material is optimally used in this system. Further, superconducting turn can be cut out from one grain of the high-quality melt-textured $YBa_2Cu_3O_{7-x}$ ceramic so that crystallographic 'ab'-plane will coincide with the ring plane. In this case, the magnetic field will be applied along the ring axis(where value $H_{c2}$ is maximal) and current flow in the 'ab' plane(where critical current density is maximal).

One more significant advantage of the described system is a small value of the reluctance of the magnetic gap. Because of this, high magnetic fields(in order of 1–2T) can be obtained by means of a small-size source of magnetomotive force.

Usage of the type II superconductors with very high values of current density in high magnetic fields allows one to obtain very high load capacity. For example, typical value of the critical current density of high-quality melt-textured $YBa_2Cu_3O_{7-x}$ ceramic is higher than 100 A/mm$^2$ in magnetic field 1–2 T. If superconducting turn is cut out from single grain of such material as described above and has cross-section area 3×3 mm$^2$, the closed current as high as 1000 A can flow without significant energy dissipation in the static mode. If the turn is shaped as a square with average side length 1 cm and one side is exposed to magnetic field 1 T, the force acting on this turn will be near 10N. It has to be noticed that mass of the turn will be near 1 g. The magnetic field 1 T in the gap, which is a little larger than the thickness of the turn (3 mm), can be easily obtained by means of small-size strong permanent magnets (for example Sm-Co or Nd-Fe-B permanent magnets are available). Therefore, very high load capacity can be obtained in this system with minimal mass and size of a bearing.

An embodiment of the rotation bearing provided for radial and angular suspension of a rotatable shaft comprises two above described radial magnetic bearings, arranged so that each of them restricts radial movement of one of the shaft ends.

Axial suspension of the shaft can be provided by using the interaction between two permanent magnets.

Roles of the movable part of the bearing and the stationary one can be interchanged so that a part of the construction comprising superconductors will be stationary and the part comprising sources of magnetic fields will be movable.

As shown earlier, the influence of the remagnetization hysteresis in the proposed system is negligible. At the same time some indeterminacy of the space position of the movable component remains because of the influence of flux creep.

This influence is eliminated in the rotational bearing with rotor comprising superconducting turns because of periodical interchanging positions of the turns. Besides, in these embodiments the automatic setting of the rotor in the central position is provided. At the same time movement of the superconductors in nonhomogeneous magnetic field, which takes place under any radial load, causes some rotation energy loss and heat release in the superconductors. It has to be noticed that to obtain high rotation speed a rotor has to move in vacuum, where cooling is limited. Thus, such bearings cannot be used under high rotation speed.

All these problems are solved in the variant where part comprising permanent magnets is used as a rotor but part comprising superconductors is rotated with a low speed also.

In the case of a linear magnetic bearing, influence of the flux creep is eliminated in an embodiment with a slider comprising source of magnetic field and a guideway comprising superconducting turns mounted one by one along the sliding direction. This system is often impracticable because complicated system for cooling of the superconductors along a whole length of a guideway is required.

Another way to eliminate influence of the current decay is usage of a slider comprising several superconducting turns arranged one by one along the sliding direction, and guideway divided into a number of separate blocks. The supporting magnetic field changes from block to block in accordance with some periodical law. Thus some external electromotive force appears in every superconducting turn moving along the guideway. The sum of the lengths of the sides of the superconducting turns directed along the sliding direction, has to be much longer than the period of the supporting magnetic field so that average lifting force acting on the slider, will be kept constant. If solenoids are used as sources of magnetomotive forces, to keep a required power minimum only the blocks which contain a slider have to be energized.

Other features and advantages of the present invention will become more apparent from the following more detailed description, taken in conjunction with the accompanying drawings which illustrate, by way of example, the principles of the invention.

BRIEF DESCRIPTION OF THE DRAWINGS

The above and other embodiments of the present invention may be more fully understood from the following detailed description when taken together with the accompanying figures wherein similar reference characters refer to similar elements throughout and in which:

FIG. 6–FIG. 10 are schematic drawings for the explanation of the process of the initial rotor setting;

DESCRIPTION OF THE PREFERRED EMBODIMENTS

The present invention is of a novel suspended bearing which takes advantage of the interaction of a superconducting shortened turn with an external magnetic field.

Figure 1:
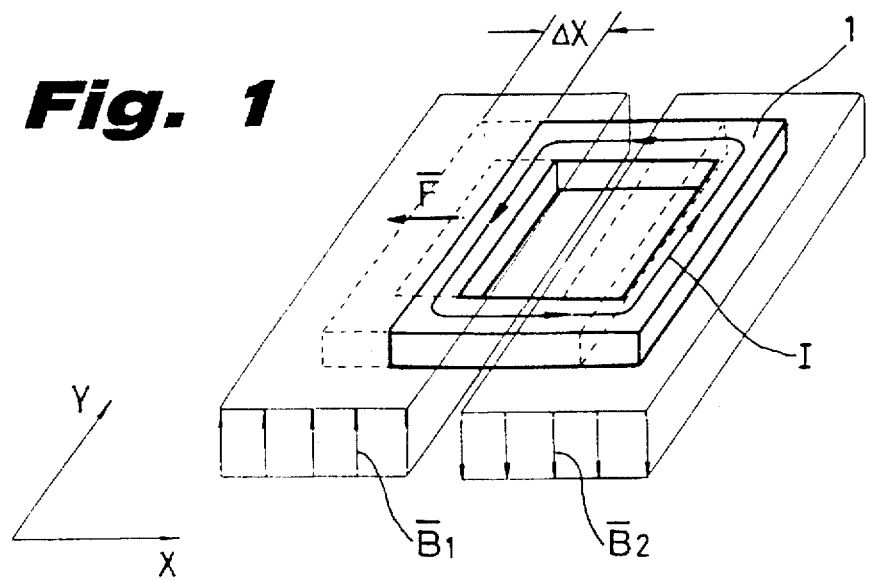
FIG. 1 is a schematic drawing for the explanation of the principle of the invention.

The principle of the invention is explained in FIG. 1. A planar shortened turn 1 made of superconducting material is exposed to an external magnetic field, normal to the turn plane, and turned into the superconducting state. It can be assumed without loss of generality, that the turn is shaped as a rectangle. Another shape of the turn is also acceptable. The magnetic field has to be shaped so that two mutually opposite rectangle sides are exposed to uniform fields $B_1$ and $B_2$. The values $B_1$ and $B_2$ have to be strongly different. In a particular case one of the values can be zero. Areas of uniformity have to be long enough in the 'X' direction so that there will be no alteration of the magnetic fields around the sides under any tolerable shift of the turn in this direction. If shift $\Delta X$ from the initial position (shown by dashed line) takes place, screening current I will appear in the turn. If the turn is made of a perfect conductor, the screening current will have such value that total magnetic flux, which is a sum of the external flux and flux produced by the screening current, will not change. As a result some forces will act on the rectangle sides comprising currents and exposed to magnetic fields. As far as magnetic fields are different for two sides normal to the shift direction, total force F will be different from zero and directed oppositely to the shift direction. If the areas of the uniform magnetic fields are lengthened in the 'Y' direction, the turn can move in this direction without any energy dissipation. Described system can be thought as a simplest linear magnetic bearing.

The advantages of the above described approach appear when shortened turn is made of type II superconductor. It is easy to see that only small volumes of the superconductor on the rectangle sides, directed along disturbing force axis, are remagnetized during a turn shift from the initial position. Hence the influence of the remagnetization hysteresis is negligibly small. Then, current in superconducting turn is directed perpendicular to the external magnetic field on the turn sides normal to the force axis. The magnetic field on the other two sides can be made much smaller. Thus, current-carrying capacity of a superconducting material is optimally used in this system. Further, superconducting turn can be cut out from one grain of the high-quality melt-textured $YBa_2Cu_3O_7$ ceramic so that crystallographic 'ab'-plane will coincide with the ring plane. In this case magnetic field will be applied along the ring axis (where value $H_{c2}$ is maximal) and current flow in the 'ab' plane (where critical current density is maximal).

One more significant advantage of the described system is a small value of the reluctance of the magnetic gap. It allows to obtain high magnetic fields (in order of 1–2 T) by means of a small size source of magnetomotive force.

Figure 2A:
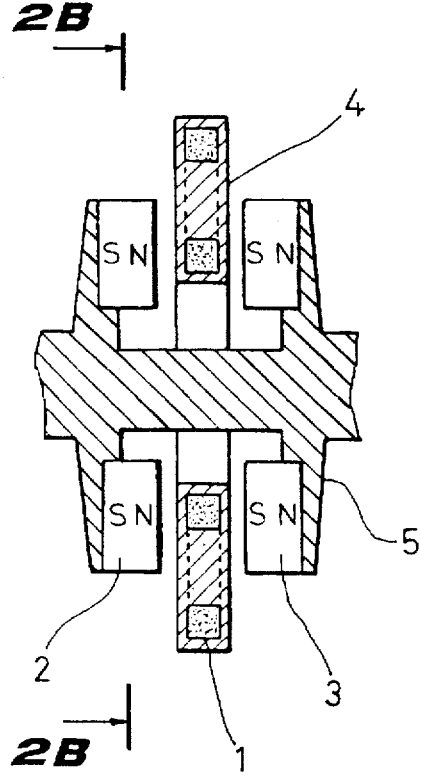
FIG. 2 is a schematic drawing of a radial magnetic bearing.
Figure 2B:
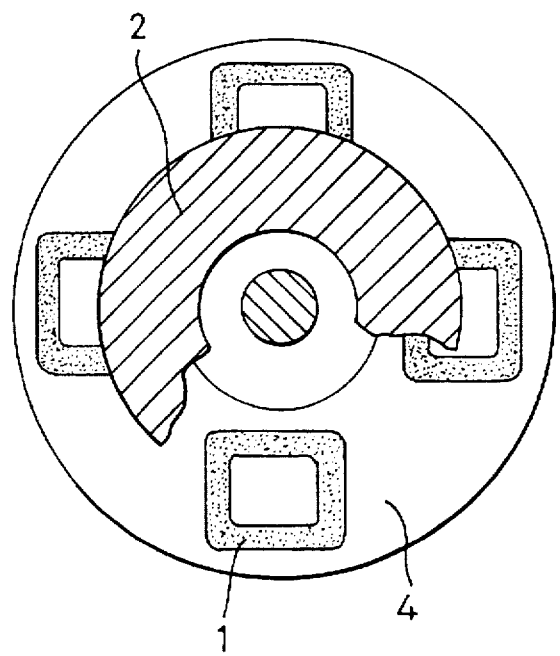

Continuous circular movement of the turn can be provided if the areas of the uniform magnetic fields form concentric rings with outer diameters much higher than turn size. If at least three superconducting turns were mounted on the common shaft circumferentially around the rotation axis (which is the common axis of the ring areas comprising uniform magnetic fields), then an embodiment of a radial magnetic bearing would be obtained. The variant of such bearing is shown in FIG. 2. The bearing comprises four superconducting turns 1 mounted on nonmagnetic rotor 4 circumferentially around the rotation axis. Magnetic field in one circular gap is generated by two axially polarized annular permanent magnets 2 and 3 mounted on the soft magnetic stator 5 and magnetic field around opposite sides of superconducting turns 1 is close to zero.

An embodiment of the rotation bearing provided for radial and angular suspension of a rotatable shaft comprises two above described radial magnetic bearings, arranged so that each of them restricts radial movement of one of the shaft ends. Axial suspension of the shaft can be provided by using the interaction between two permanent magnets.

Roles of the movable part of the bearing and the stationary one can be interchanged so that a part of the construction comprising superconductors will be stationary and the part comprising sources of magnetic fields will be movable.

Figure 3A:
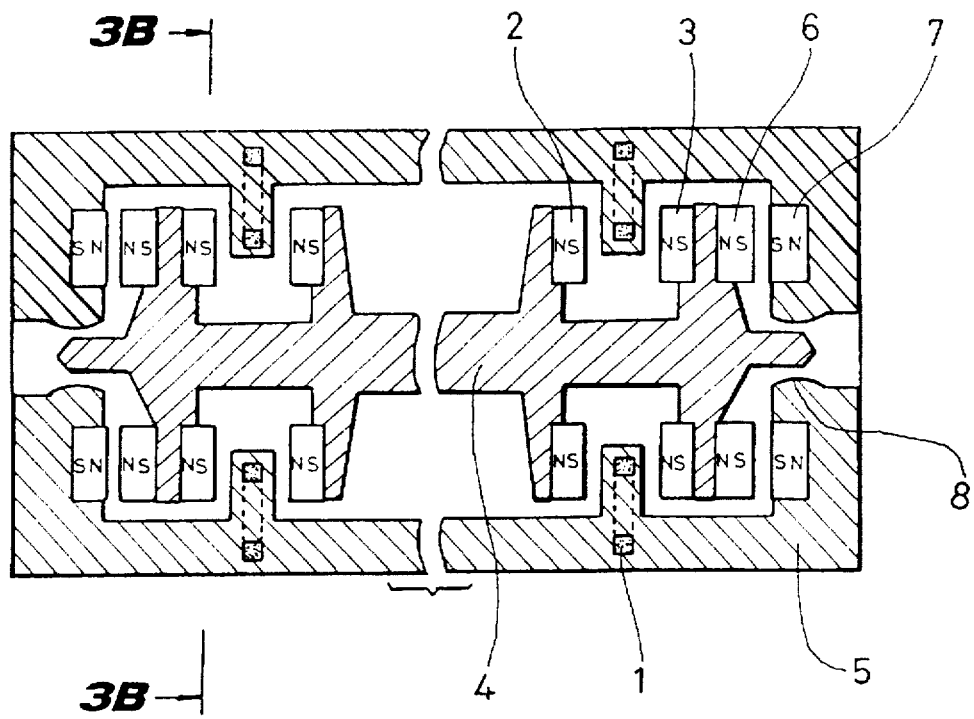
FIG. 3 is a schematic drawing of an axial and radial magnetic bearing.
Figure 3B:
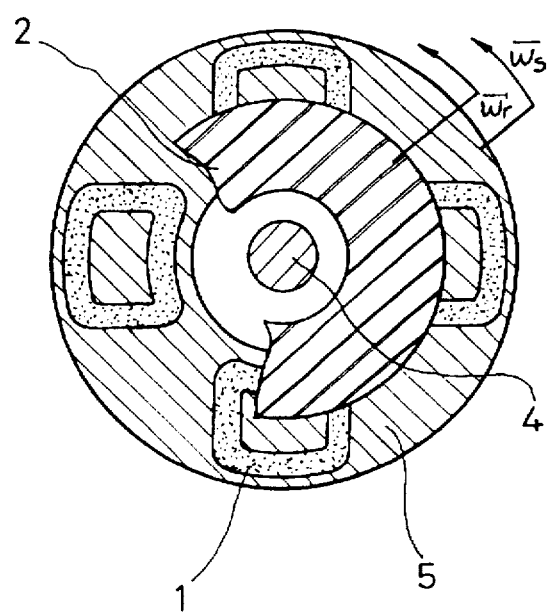

Such an embodiment of a radial and axial magnetic bearing with superconductors mounted on the stator and permanent magnet mounted on the rotor is show in FIG. 3. In this embodiment two pairs of annular permanent magnets 2 and 3 with axial magnetization are mounted on the ends of soft magnetic shaft 4 so that uniform magnetic fields are generated in the circular gaps between the poles of every pair of the magnets. At least three square-shaped shortened superconducting turns 1 are mounted on non-magnetic stator 5 between the poles of every pair of the magnets and circumferentially around shaft 4 so that near half of every turn is placed in the magnetic field. If the shaft 4 were set in the central position, then after any radial or angular displacement of the shaft currents would appear in superconducting turns 1 such that a restoring force or moment would act on the shaft. To support shaft 4 in the axial direction, the interaction between permanent magnets 6 and 7 is used. The designation of the supporting surfaces 8 will be explained later.

As shown earlier, the influence of the remagnetization hysteresis in proposed system is negligible. At the same time, some indeterminacy of the space position of the movable component remains because of influence of the flux creep.

This influence is eliminated in the rotational bearing with rotor comprising superconducting turns because of periodical interchanging positions of the turns. Besides in these embodiments the automatic setting of the rotor in the central position is provided. Unfortunately, these advantages are only one side of a coin. At the same time movement of the superconductors in nonhomogeneous magnetic field, which takes place under any radial load, causes some rotation energy loss and heat release in the superconductors. It has to be noticed that to obtain high rotation speed a rotor has to move in a vacuum, where cooling is limited. Thus, such bearings cannot be used under high rotation speed. Moreover, under certain working conditions a rotor comprising superconduction turns can rotate around axis different from the rotor symmetry axis.

All above mentioned disadvantages are excluded in the variant where part comprising permanent magnets is used as a rotor but part comprising superconductors is rotated with a low speed also. In this case superconductors cannot sense any variation of the supporting magnetic field during rotation of the rotor about its symmetry axis, regardless of the radial position of the rotor. There is no requirement of the rotor cooling and, consequently, there are no limitation on the rotor rotation speed. At the same time rotation of the stator provides periodical interchanging of positions of the turns and, therefore, elimination of any ambiguity of the rotor position. Usual ball bearings can be used for supporting the stator rotating with a low speed. Supporting surfaces 8 shown in FIG. 3 are provided to restrict the initial shift of the shaft and provide possibility of relative slipping of shaft 4 about stator 5 during the initial setting process, if the variant with "rotating stator" is used.

Figure 4A:
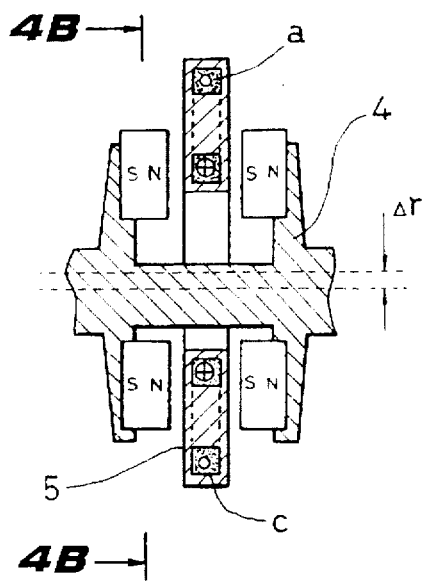
FIG. 4 and FIG. 5 are schematic drawings for the explanation of the compensation of the current decay.
Figure 4B:
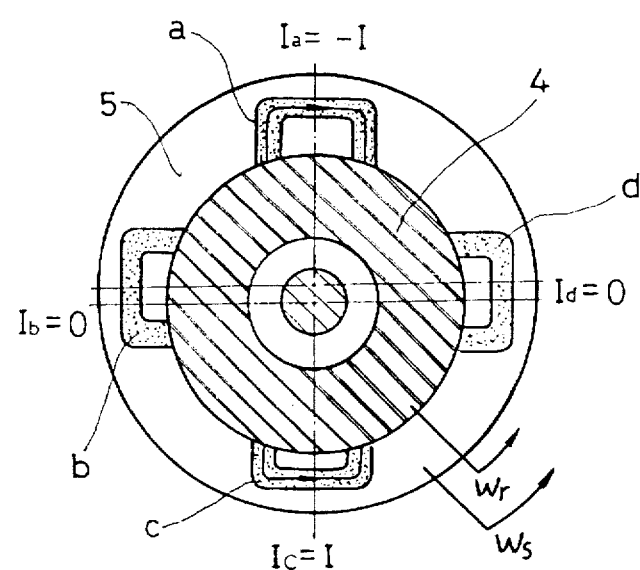
Figure 5:
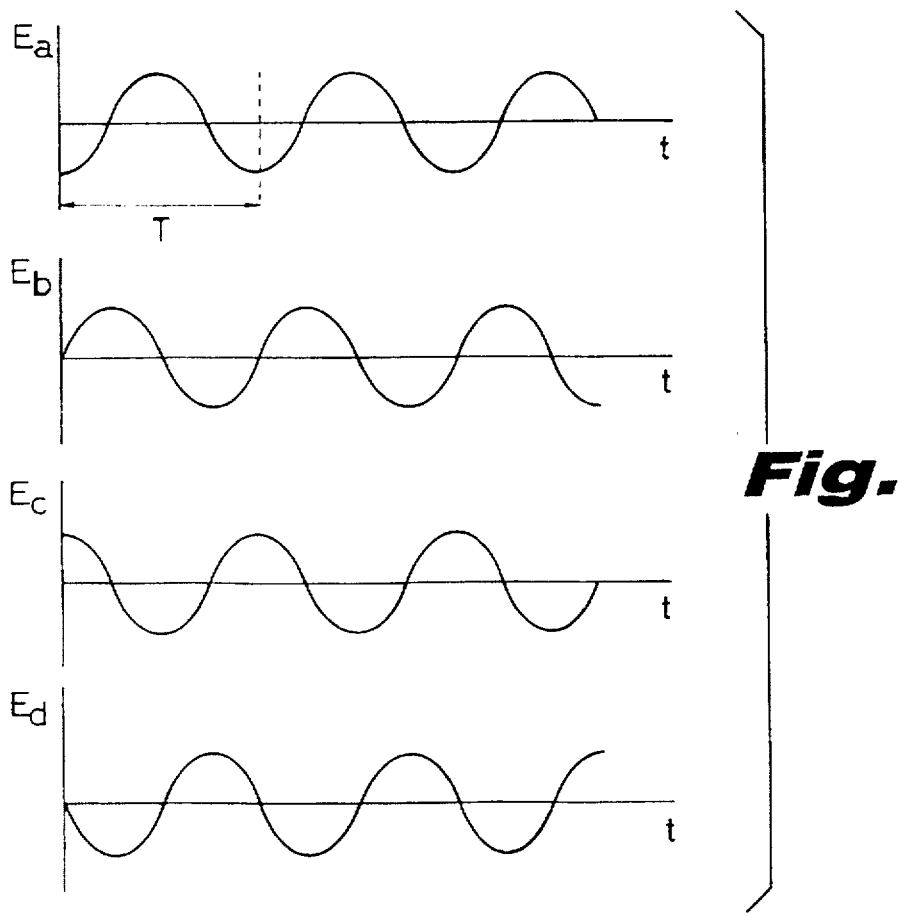

In more detail the process of the compensation of the current decay is explained in FIGS. 4 and 5. In FIG. 4 rotor 4 is shown shifted from the central position in the vertical direction. If stator 5 with four superconducting turns a–d is rotated compulsory about its own axis, electromotive forces will appear in the superconducting cylinders and prevent current decay as in an usual ac transformer. There are time dependencies of the "external" electromotive forces in the superconducting turns (defined as $d\Phi^{iext}/dt$; where $d\Phi^{iext}$ is the magnetic flux flowing through i-th turn) in FIG. 5. The real values of the electromotive forces defined as $(d\Phi^{iext} - d\Phi^{iscr})/dt$ (where $\Phi^{iscr}$ is the magnetic flux produced by the screening current in i-th turn) will be very small and non-sinusoidal (due to non-linear dependence of the current density vs electrical and magnetic field in the type II superconductors) but periodical with time period of T. The current behavior will be periodical with the same time period. As a result of the interaction of these currents with an external magnetic field, constant force acting on the rotor in the direction opposite to the shift will appear. The only advantages of usage of type II superconductors instead of conventional conductors are very high currents ($10^2-10^4$ A/mm$^2$), very small energy loss and very low rate of the current decay. The last fact allows to use very slow stator rotation speed and makes this system practicable.

An additional advantage of the system comprising rotating stator is an enhanced current density in the superconducting turns, compared to the static mode, because critical current density in the type II superconductors was shown to increase with increasing an electrical field strength(Physica C 174, 14–22, 1991). It allows to obtain higher load capacity and stiffness of a bearing. Some increasing of the heat release in the superconducting turns is not a problem because cooling of a superconductors can be easily provided.

One more advantage of the variant comprising rotating stator is the automatic setting of a rotor in the central position. The rotor setting process is explained in FIGS. 6, 7, 8 and 9. The rotor position when the superconductors turn in the superconducting state is shown in FIG. 6. There is some initial displacement of the rotor axis from the stator axis Δr in this moment. In this position magnetic flux through the turn "a" is minimal, magnetic flux through the turn "c" is maximal and fluxes through turns "b" and "d" are intermediate. There are no currents in the turns in this position. When the stator begins rotating with some speed $\omega_s$, screening currents will appear. The current directions, external magnetic field direction and forces acting on the rotor, which are equal and oppositely directed to the forces acting on the turns "a","b", "c" and "d" are shown in FIG.

Figure 8A:
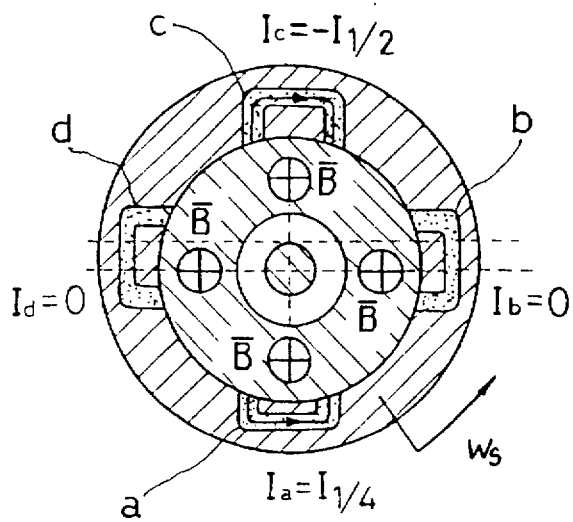
Figure 8B:
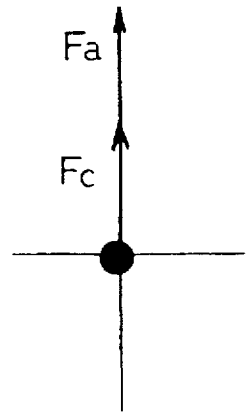
Figure 9A:
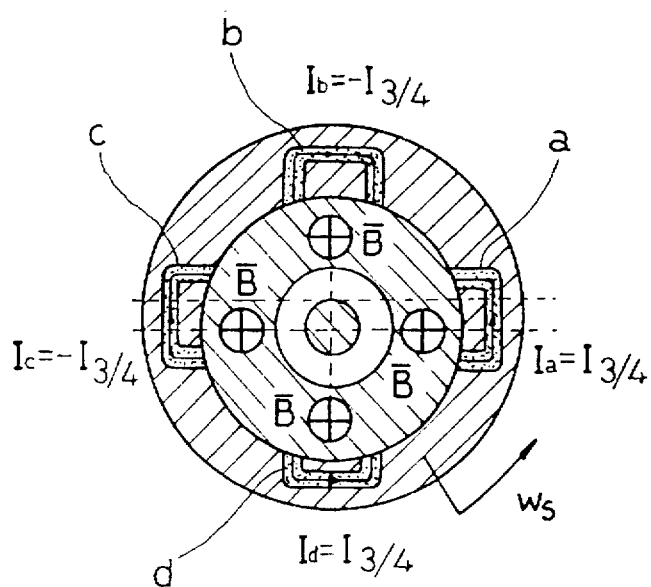
Figure 9B:
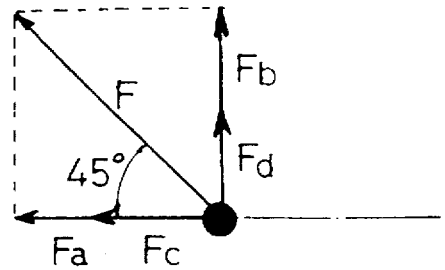
Figure 10:
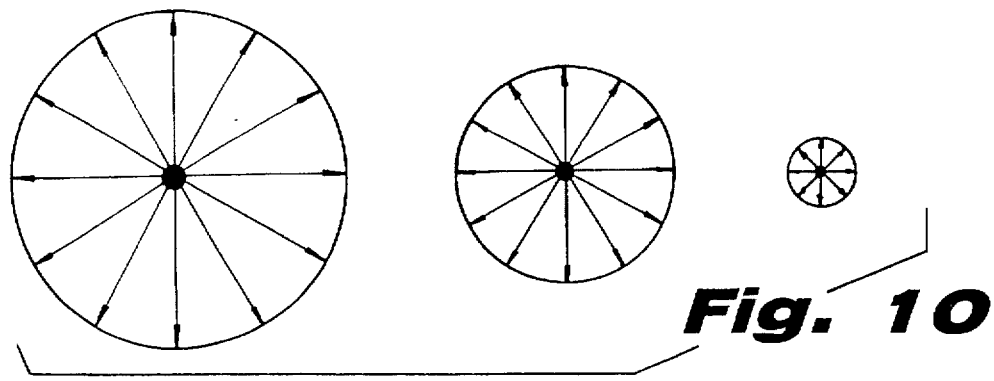

7 after one quarter of revolution, in FIG. 8 after half of revolution and in the FIG. 9 after three quarters of revolution. The followed convention in this paper is that vector going into the page is denoted by "+" while vector coming out of the page is denoted by "●". It is easy to see that the total force acting on the rotor consists of the time-independent component making rotor to move to the central position and oscillating one. After some time under influence of the constant component the rotor will be set in the central position, if there is no external radial load. Since this moment, there will be no constant force but oscillating one. Due to full axial symmetry of the system the amplitude of this force will not depend on the stator rotation angle and only force direction will change. So, the end of the vector of the force will circumscribe a circle with the center on the symmetry axis. Due to the decay of the superconducting current the magnitude of the oscillating force will degrade with time (FIG. 10).

Figure 11A:
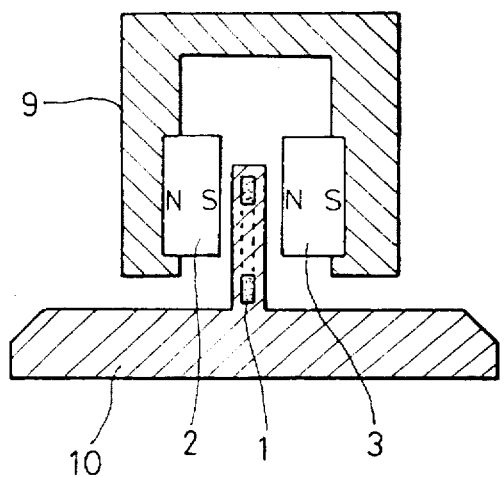
FIG. 11 is a schematic drawing of a linear magnetic bearing with superconducting turns mounted on the guideway.
Figure 11B:
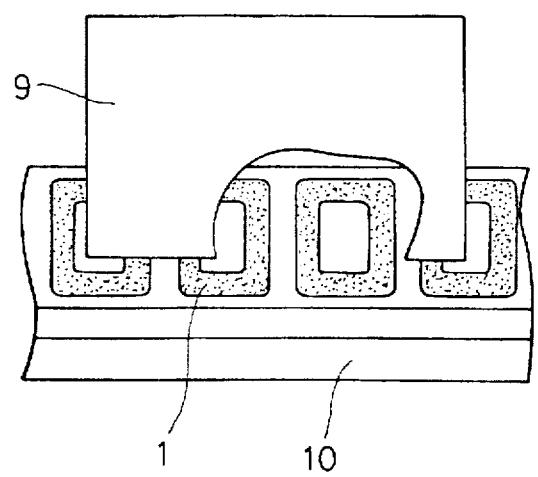

In the case of a linear magnetic bearing influence of the flux creep is eliminated in an embodiment shown in FIG. 11 with a slider 9 comprising permanent magnets 2 and 3 and a guideway 10 comprising superconducting turns 1 mounted one by one along the sliding direction. This system is often impracticable because complicated system for cooling of the superconductors along a whole length of guideway is required.

Figure 12:
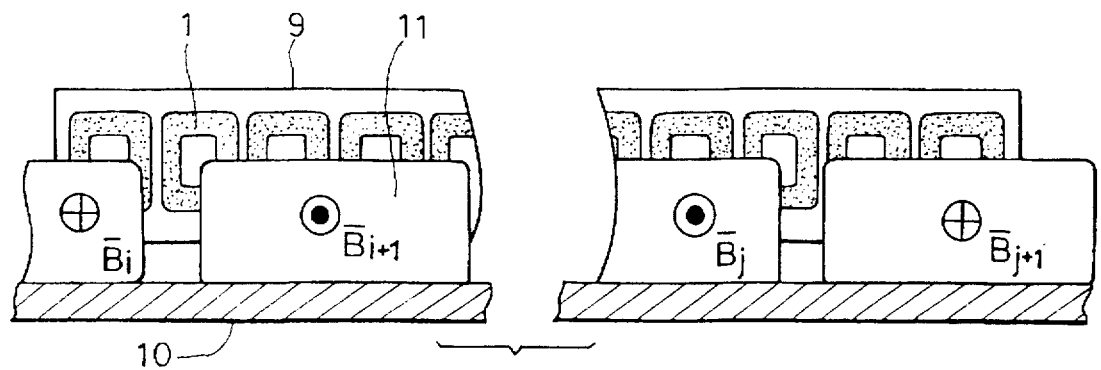
FIG. 12 is a schematic drawing of a linear magnetic bearing with superconducting turns mounted on the slider and compensation of the current decay.

Another way to eliminate influence of the current decay is shown in FIG. 12. In this variant slider 9 comprises several superconducting turns 1 arranged one by one along the sliding direction. The guideway 10 is divided into a number of blocks 11. The supporting magnetic field changes from block to block in accordance with some periodical law. Thus some external electromotive force appears in every superconducting turn moving along the guideway. The sum of the lengths of the sides of the superconducting turns, directed along the sliding direction, has to be much longer than the period of the supporting magnetic field so that average lifting force, acting on the slider, will be kept constant. If solenoids are used as a sources of magnetomotive forces, to keep a required power minimum only the blocks which contain a slider have to be energized. This embodiment can be used in suspension systems of high-speed trains.

It is clear that restriction of additional degrees of freedom of a slider can be obtained by usage of several above described units restricting one translation degree of freedom. This simple development cannot be thought as an invention and family of such devices is not described here.

Many challenges faced presently in various fields of science and technology can be solved by usage of the proposed superconducting magnetic bearing. One of the promising applications is in cryogenic turbopumps of rocket engines. In an oxygen turbopump a bearing operates under temperature near 90K and in a hydrogen turbopump temperature is near 33K. The bearing has to operate under extremely high load which is in order of 4500-22500N and high rotation speed of 30-40 rpm. Operation of the presently used mechanical bearings under high loads in a cryogenics environment causes excessive wear and the practice today is to replace turbopumps after every 3 shuttle flights. On the contrary, cryogenic temperature is a suitable environment for the superconducting materials. High ratios of the load capacity and stiffness vs bearing size and weight make the new bearing very promising for the space applications where payload is limited. One more significant advantage is that no external energy is required for the bearing operation. This fact is also of great importance for space applications, where energy supply is limited. It is believed, that the proposed bearing structure will be successfully applied in many space-borne systems where it can be passively cooled by locating on the shaded side of a space vehicle. Among them space craft orientation system (for example, broadcasting satellite orientation system), satellite flywheel energy storage system and artificial gravity space station should be mentioned.

In the space craft orientation system angular orientation of a spacecraft is controlled by exchanging angular momentum between the craft and a flywheel. In this system change and precise control of the spacecraft orientation can be provided without any external energy consumption. To obtain high angular momentum with minimal size and weight of the device, the rotation speed of the flywheel has to be as high as possible. Usage of the superconducting magnetic bearing possessing extremely low rotational friction provides a unique opportunity for developing this application.

Satellite flywheel energy storage system is an alternative to the presently used electrochemical batteries in the low orbit satellites. For example, in a low orbit satellite with 90 minute cycle the electrical energy is supplied by photovoltaic cells during 60 minutes when the satellite is exposed to the sunlight. During this term the batteries store energy. During the following 30 minutes the satellite is in the shadow of the Earth and electrical energy is supplied by the batteries. Unfortunately, electrochemical batteries are known to have limited lifetime. Besides, it is difficult to measure the charge of the batteries. The flywheel energy storage system with superconducting magnetic bearings can store electrical energy as rotation energy of a flywheel. The flywheel energy storage system is expected to provide much higher lifetime, higher efficiency and higher ratio of the stored energy vs weight of the device than electrochemical batteries.

The artificial gravity system provides artificial gravity in a part of the space station to prevent physiological damage of the crew members during their stay in the zero gravity conditions. Artificial gravity can be obtained by rotation of this part of the station. At the same time another part of the station is often required to keep fixed orientation. The superconducting magnetic bearing can be used to link two parts mechanically and provide possibility of the rotation of one part in relation to the other.

As an example of the application of the superconducting magnetic bearing on the Earth, a magnetic bearing for Liquefied Natural Gas Service can be mentioned. The submerged motor pump is one of the important parts of the equipment in LNG plants. Presently, specially designed mechanical bearings are used to support the rotor of the pump. Extreme operating conditions such as low temperature (−162° C.) and high rotation speed (16400 rpm) limit the life time of the bearing. It is important to note that LNG is a dangerously explosive medium. Because of this, usage of a conventional magnetic bearing is undesirable, because every damage of high-inductivity windings comprising high currents will leads to explosion. Thus, the superconducting magnetic bearing seems to be only solution of the problem of the suspension of the rotor in the LNG pump.

Although the present invention has been disclosed in connection with a number of specific embodiments, it is believed that many different additional geometrical configurations may be used without departing from the spirit of the present invention. Additional configurations can be obtained by rearranging the shape, size, thickness, and etc., of the various structural members. Furthermore, many combinations of the various features of the present invention may be made without the exercise of additional invention in the light of the present teachings.

It is seen that the present invention and the embodiments disclosed herein are well adapted to carry out the objectives and obtain the aims. Certain changes can be made in the method without departing from the spirit and the scope of this invention. It is realized that changes are possible and it is further intended that each element recited in any of the following claims is to be understood as referring to all equivalent elements for accomplishing substantially the same result in substantially the same or equivalent manner. It is intended to cover the invention broadly in whatever form its principles may be utilized. The present invention is, therefore, well adapted to carry out the objects and obtain the ends and advantages mentioned, as well as other inherent therein. Those skilled in the art may find many variations and adaptations thereof, and such variations and adaptations, falling within the true scope and spirit of applicant's invention, are intended to be covered thereby.

What is claimed is:

1. A passive magnetic bearing structure for the radial supporting of a rotor with respect to a stator, comprising:

a stator;

a rotor;

a magnetic circuit mounted on the rotor or stator and generating two strongly different axially magnetic fields in two concentric annular gaps coaxial to the rotation axis and radially spaced from each other;

at least three shortened superconducting turns mounted on the stator circumferentially around the rotation axis and circumferentially spaced from each other so that under any tolerable shift of the rotor, one edge of every turn will be placed in one annular gap comprising magnetic field, and the radially opposite edge will be placed in the other gap.

2. A linear magnetic bearing structure for the restriction of one translation degree of freedom of a slider comprising:

a slider;

a guideway;

a magnetic circuit mounted on the guideway and generating two strongly different magnetic fields, perpendicular to the movement direction, in two layers lengthened in the sliding direction and spaced from each other in the direction normal to both sliding direction and magnetic field direction;

shortened superconducting turn mounted on the slider so that under any tolerable shift of the slider, one edge of turn will be placed in one layer comprising magnetic field, and the radially opposite edge will be placed in the other layer.

3. A linear magnetic bearing structure for the restriction of one translation and one angular degrees of freedom of a slider comprising:

a slider;

a guideway;

a magnetic circuit mounted on the slider and generating two strongly different magnetic fields, perpendicular to the sliding direction, in two layers lengthened in the sliding direction and spaced from each other in the direction normal to both sliding direction and magnetic field direction;

shortened superconducting turns mounted on the guideway one by one along the sliding direction so that under any tolerable shift of the slider, one edge of every turn, covered by the slider, will be placed in one layer comprising magnetic field, and the radially opposite edge will be placed in the other layer.

4. A linear magnetic bearing structure for the restriction of one translation and one angular degrees of freedom of a slider comprising:

a slider;

a guideway consisting of several separated blocks placed one by one in the sliding direction;

magnetic circuits mounted on blocks, each of them generating two strongly different magnetic fields, perpendicular to the movement direction and changing in accordance to some periodical law from block to block, in two layers lengthened in the sliding direction and spaced each other in the direction normal to both sliding direction and magnetic field direction;

shortened superconducting turns mounted on the slider one by one along the sliding direction so that under any tolerable shift of the slider, one edge of every turn will be placed in one layer comprising magnetic field, and the radially opposite edge will be placed in the other layer.

5. A linear magnetic bearing structure for the restriction of one translation and one angular degrees of freedom of a slider of claim 4 and in which a magnetic circuit of every block comprises an electromagnet as a source of magnetomotive force and only electromagnets of blocks comprising the slider are energized.

6. Magnetic bearing structure of claim 1, in which superconducting turn is made of an anisotropic type II superconducting material having an axis of maximal $H_{c2}$, which has to be directed perpendicular to the turn plane, and plane of maximal $j_c$ which has to coincide with the turn plane.

7. Magnetic bearing structure of claim 1, in which superconducting turn is made of an anisotropic type II superconducting material having an axis of maximal $H_{c2}$, which has to be directed perpendicular to the turn plane, and plane of maximal $j_c$ which has to coincide with the turn plane.

8. Magnetic bearing structure of claim 2, in which superconducting turn is made of an anisotropic type II superconducting material having an axis of maximal $H_{c2}$, which has to be directed perpendicular to the turn plane, and plane of maximal $j_c$ which has to coincide with the turn plane.

9. Magnetic bearing structure of claim 3, in which superconducting turn is made of an anisotropic type II superconducting material having an axis of maximal $H_{c2}$, which has to be directed perpendicular to the turn plane, and plane of maximal $j_c$ which has to coincide with the turn plane.

10. Magnetic bearing structure of claim 4, in which superconducting turn is made of an anisotropic type II superconducting material having an axis of maximal $H_{c2}$, which has to be directed perpendicular to the turn plane, and plane of maximal $j_c$ which has to coincide with the turn plane.

11. Magnetic bearing structure of claim 5, in which superconducting turn is made of an anisotropic type II superconducting material having an axis of maximal $H_{c2}$, which has to be directed perpendicular to the turn plane, and plane of maximal $j_c$ which has to coincide with the turn plane.

12. Magnetic bearing structure of claim 1, wherein each turn is shaped as a rectangle, such that two mutually opposite sides of the rectangle are exposed to uniform fields.

13. Magnetic bearing structure of claim 12, wherein each turn is composed of type II superconductor.

14. Magnetic bearing structure of claim 13, wherein each turn is composed of $YBa_2Cu_3O_{7-x}$ ceramic.

15. Magnetic bearing structure of claim 1, wherein the stator is arranged to be rotatable about its own axis.

16. Magnetic bearing structure of claim 1, comprising four shortened superconducting turns mounted on the stator.

17. A passive magnetic bearing structure which is of claim 15 in which the stator is rotated with low speed compared to rotation of the rotor.

* * * * *